Aug. 25, 1931.　　　H. A. W. WOOD　　　1,820,551
MATRIX ROLLER
Filed Jan. 8, 1930　　　2 Sheets-Sheet 1

Inventor
Henry A. Wise Wood

Aug. 25, 1931.   H. A. W. WOOD   1,820,551
MATRIX ROLLER
Filed Jan. 8, 1930   2 Sheets-Sheet 2

Inventor
Henry A. Wise Wood
By attorneys

Patented Aug. 25, 1931

1,820,551

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

MATRIX ROLLER

Application filed January 8, 1930. Serial No. 419,323.

This invention relates to a device for rolling or molding stereotype printing plate matrices.

The principal object of the invention is to provide means for performing the function of molding by the use of a sheet of soft material between a roller and the matrix and then performing a molding operation directly on the surface of the matrix; to provide a method of molding and finishing the stereotype matrix in which the matrix will be efficiently molded into the irregularities of the form and to provide a method of accomplishing the above results which will be both rapid to carry out and efficient in practice.

Other objects and advantages of the invention will appear hereinafter.

Reference is to be had to the accompanying drawings in which

Figure 1:
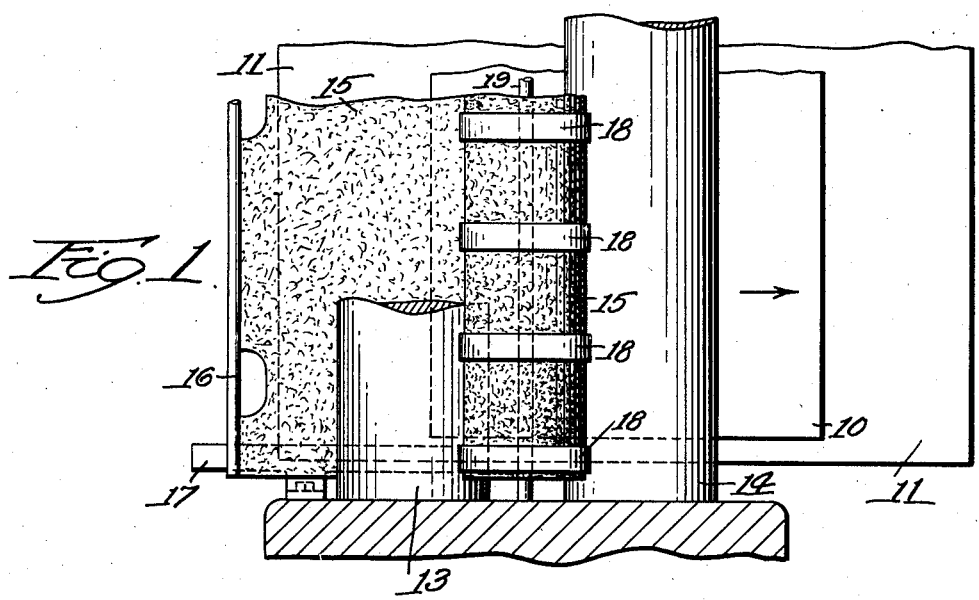
Fig. 1 is a plan of a machine for carrying out the molding operation in its preferred form.
Figure 2:
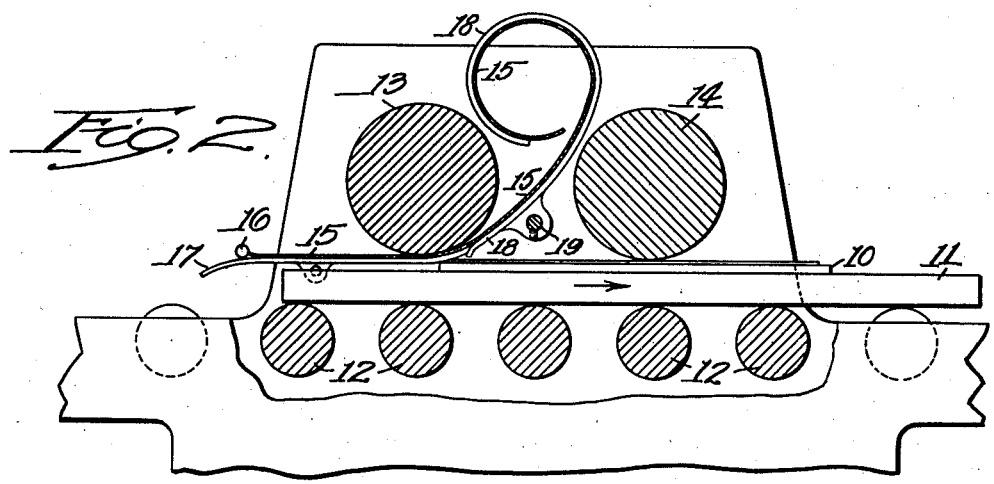
Fig. 2 is a longitudinal sectional view of the same.
Figure 3:
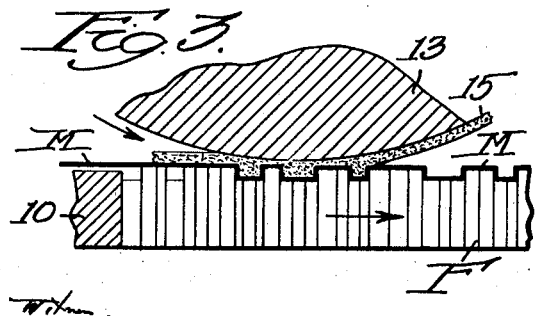
Figure 4:
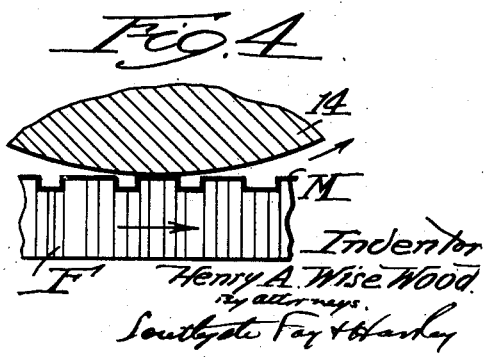
Figure 5:
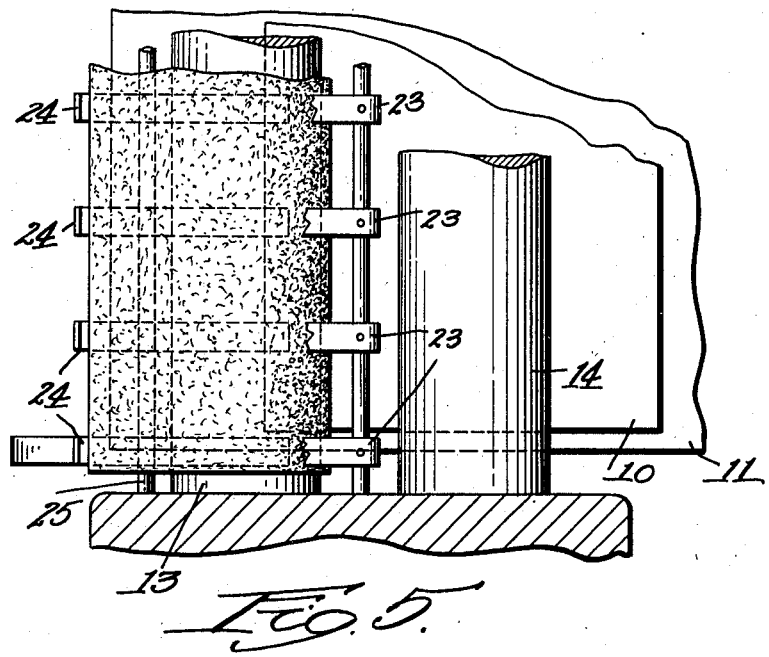
Figure 6:
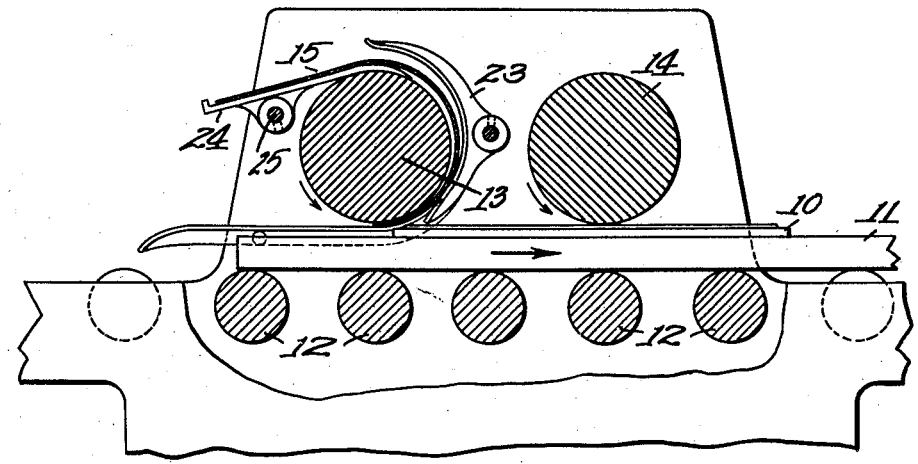

Figs. 3 and 4 are two views on enlarged scale showing the first and second steps of the molding operation, and Figs. 5 and 6 are views similar respectively to Figs. 1 and 2 showing another form of the apparatus.

It is customary, as shown in my prior Patent No. 1,060,875, dated May 6, 1913, to employ a brush for the molding and a roller for finally rolling down the matrix. In the present case the brush is eliminated and a novel and more efficient means is employed to secure a more positive forcing of the matrix into the intricacies of the form.

In Figs. 3 and 4 I show a form of the invention in which the matrix M is to be molded into the form F. The form, of course, is mounted in a chase 10 and this is carried by a movable platform 11 freely movable on idler rolls 12 which are supported in bearings to turn freely.

The chase is movable under a pair of rollers 13 and 14. They are both smooth rolls and the roller 13 is placed slightly above the form while the roller 14, as in the case of my above mentioned patent, is in contact with the form and operates the same in all respects as the second roller shown in that patent.

The roller 13 is arranged to cooperate with a soft or resilient blanket 15 which may be of cork or felt. This blanket is made of sufficient length and is of sufficient width to overlap the form at its sides. It is provided with a bar 16 across its end. The bar 16 prevents the blanket from being pulled through the frames. The free end of the blanket is placed over the forward edge of the chase and the chase run through under the roller 13, the blanket moving with the chase and being supported up to the end of the chase by guides 17.

The end of the blanket is separated from the chase by another set of guides or switches 18 which are placed at intervals across the machine just above the chase. It is carried up into a scroll or hollow cylinder into which these guides are formed. These guides are supported by a cross bar 19 or in any other desired way.

The method of operation is very simple. The chase and blanket move along in a straight line with the blanket located between the roller 13 and the form. The blanket is stripped from the form by the guides 18 and comes up as shown in Fig. 2 into these guides where it is partially rolled up. This, of course, is an intermittent motion for the blanket and after the chase has passed beyond it the bar 16 is grasped by the operator and is pulled back by means of this bar toward the operator and out of the machine, or at least so the end is ready for the next chase to be introduced beneath it. The blanket, of course, is removed from the position in which it is left after the form has passed and before the next form is ready to go under it.

The form that has passed under the roller 13 moves along without interruption in its motion under the smooth roller 14 where the matrix is rolled without a blanket and forced further into the form, the same as in my above mentioned patent. This provides a matrix that is of one thickness between its face and the back, as it does not depend on any resilient or soft surface for the final molding but is molded between two hard surfaces.

In the form shown in Figs. 5 and 6 the operation is substantially the same except that, instead of having the blanket curl up into a space between the two rollers, the machine is provided with deflectors 23 that turn the blanket up over the roller 13 and deliver it on supporting members 24 mounted on a rod 25 extending across the machine. This table leaves the end of the blanket where the operator may pull it forward toward him and then introduce it back into the machine rapidly for further operation.

It is to be observed that the matrix is first molded with the soft or flexible blanket between a smooth roller and the form, which passes along with the form, and results in forcing the matrix into the irregularities of the form. Then the form is rolled by a hard, preferably metal, roller 14 so that the matrix will come out of the machine of uniform thickness between its back and the face of the type. The use of the blanket is not new in the molding of stereotype matrices but heretofore where blankets have been used it is entirely a hand process. In this case the blanket feeds with the matrix and means is provided for delivering the blanket where it can be reached by the operator and used over again without undue handling or any danger of the blanket getting crumpled up and becoming hard to handle. The two roller operations are continuous.

Although I have illustrated and described only two forms of the invention I am aware of the fact that other modifications can be made therein by any person skilled in the art without departing from the scope of the invention as expressed in the claims. Therefore I do not wish to be limited in this respect but what I do claim is:—

1. The method of molding and finishing a stereotype matrix which consists in first molding it to irregularities of the form against a sheet of resilient substance, pressing said sheet into the form behind the matrix, automatically removing the sheet of resilient substance and thereafter finishing the back of the matrix against the surface of the form in a continuous operation by a hard surface.

2. The method of molding and finishing a stereotype matrix which consists in locating a soft blanket over the back of the matrix, passing the blanket and form under a hard roll, separating the blanket automatically from the form after it has been rolled and directing the blanket to a place from which it can be removed for the next operation and continuously rolling the matrix into the form by a hard surfaced roller as the form moves forward from the first roller.

3. In a device for molding and finishing stereotype matrices, the combination with means for supporting a chase movably, of a pair of smooth rollers one located in position to be just out of contact with the surface of the matrix on the form and the other in position to engage and roll the said matrix, and a guide located at the side of the first roll for receiving a soft blanket located between the first roll and the form and turning it upwardly away from the matrix automatically before it passes under the second roller.

4. In a matrix rolling machine, the combination of freely rotatable rolls, a platform supported upon them and adapted to be moved along a straight line on the rolls, said platform being adapted to support a flat chase with a type form therein, two smooth surfaced cylindrical rollers located over the first named rolls, one of said rollers being located slightly spaced from the surface of the matrix in the chase, a blanket adapted to be rolled into the matrix by the passage of the chase under said spaced roller, and guides for taking the blanket from the matrix as soon and as fast as it is rolled and directing the blanket up between the two rollers and coiling it up in that position, the other roller being located in a position to engage the back of the matrix after the blanket has been removed from it and roll it down to a uniform thickness.

5. In a matrix rolling machine, the combination of a platform adapted to be moved along to support a flat chase with a type form therein, two smooth surfaced cylindrical rollers, one of said rollers being located slightly spaced from the surface of the matrix in the chase, a blanket adapted to be rolled into the matrix by the passage of the chase under the said spaced roller, and guides for taking the blanket from the matrix as soon as it is rolled and directing the blanket up, the other roller being located in a position to engage the back of the matrix after the blanket has been removed from it and roll it down to a uniform thickness.

6. In a matrix rolling machine, the combination of a platform adapted to be moved and adapted to support a chase with a type form therein, two smooth surfaced cylindrical rollers located over the platform, one of said rollers located slightly spaced from the surface of the matrix in the chase, a blanket adapted to be rolled into the matrix by the passage of the chase under the said spaced roller, guides for taking the blanket from the matrix as soon and as fast as it is rolled and directing the blanket up over and around the first roller, and a table over the first roll and extending to the front for receiving the leading end of the blanket, the other roll being located in a position to engage the back of the matrix after the blanket has been removed from it and roll it down to a uniform thickness.

7. The method of molding and finishing a stereotype matrix which consists in first molding it to irregularities of the form against a sheet of resilient substance, pressing said sheet into the form behind the matrix, removing the sheet of resilient substance and thereafter finishing the back of the matrix against the surface of the form in a continuous operation by a hard surface.

8. The method of molding and finishing a stereotype matrix which consists in locating a soft blanket over the back of the matrix, passing the blanket and form under a hard roll, separating the blanket from the form after it has been rolled and directing the blanket to a place from which it can be removed for the next operation and continuously rolling the matrix into the form by a hard surfaced roller as the form moves forward from the first roller.

In testimony whereof I have hereunto affixed my signature.

HENRY A. WISE WOOD.